April 17, 1945. R. D. PIKE 2,373,913
PRODUCTION OF MAGNESIA AND CALCIUM CARBONATE FROM DOLOMITE
Filed Sept. 28, 1943
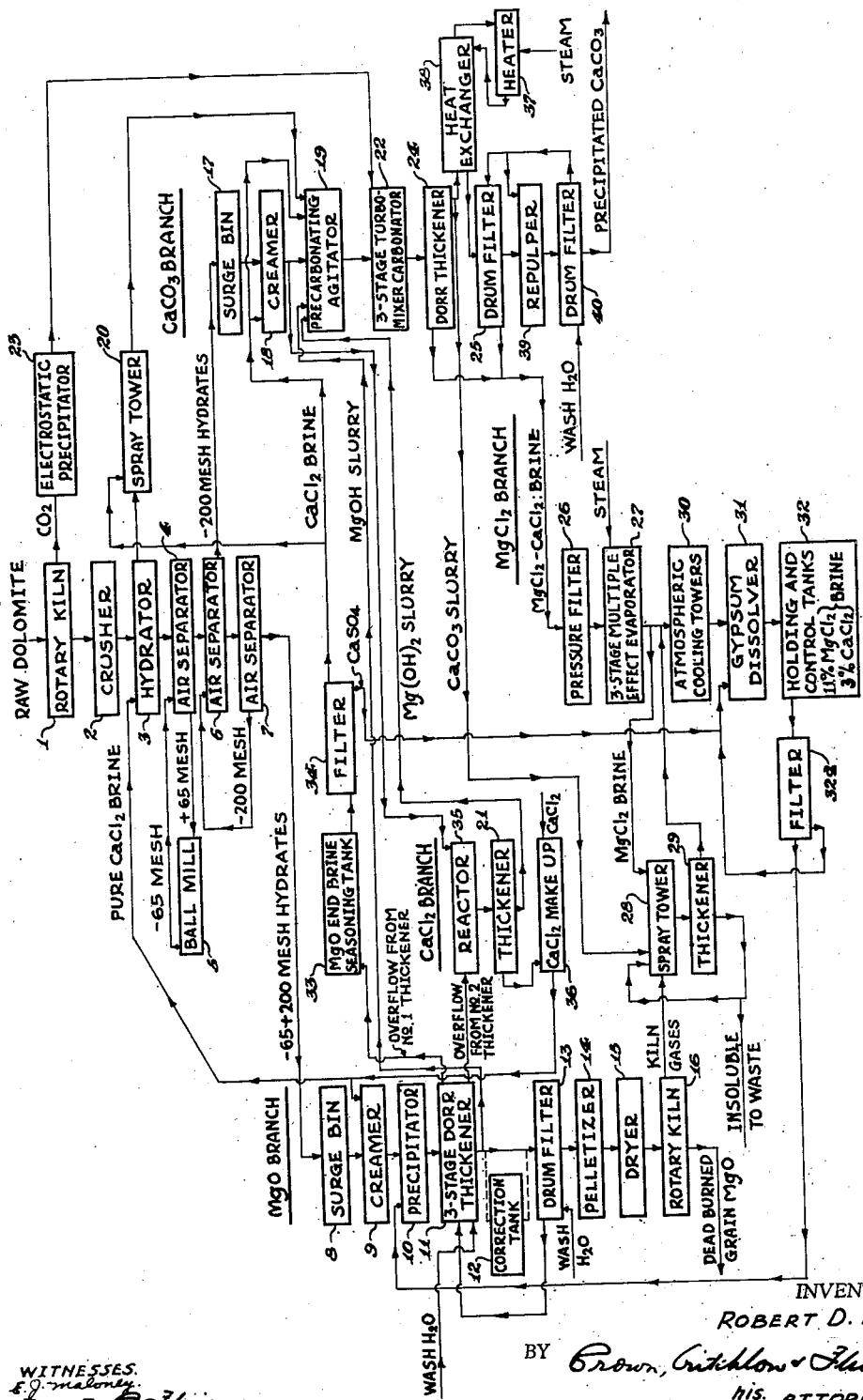
INVENTOR.
ROBERT D. PIKE.
BY
his ATTORNEYS.

Patented Apr. 17, 1945

2,373,913

UNITED STATES PATENT OFFICE 2,373,913

PRODUCTION OF MAGNESIA AND CALCIUM CARBONATE FROM DOLOMITE

Robert D. Pike, Pittsburgh, Pa., assignor to Harbison-Walker Refractories Company, Pittsburgh, Pa., a corporation of Pennsylvania Application September 28, 1943, Serial No. 504,128

15 Claims. (Cl. 23—66)

This invention relates to the production of magnesia from dolomite, and particularly to the production of magnesia and calcium carbonate by a modification of the process disclosed in my copending application, Serial No. 402,935, filed July 18, 1941, of which this application is a continuation-in-part.

The process of my aforesaid application involves a cyclic process for the treatment of dolomite to produce magnesia and calcium carbonate which are characterized by being rapid settling and easily filterable. The details of that invention which led to the development of those properties will be described sufficiently hereinafter. Suffice it at this point to state that calcined dolomite is dry hydrated and the hydrates are divided into granular and fines fractions. The granular material is reacted with a recycled magnesium chloride $(MgCl_2)$ brine to produce hydrated magnesia $[Mg(OH)_2]$ by the reaction:

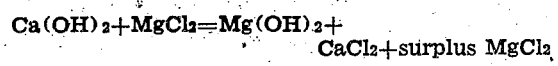

(Reaction I)

The $MgCl_2$ used for that purpose is regenerated by reacting the fine fraction of the dolomite hydrates with the calcium chloride $(CaCl_2)$ and residual $MgCl_2$ produced by the foregoing reaction, and carbonating the reaction mixture after all of the calcium hydroxide of the fine fraction has been converted to calcium chloride by reaction with the residual $MgCl_2$, thus regenerating the cycling $MgCl_2$ required in Reaction I and precipitating calcium carbonate $(CaCO_3)$:

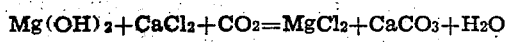

(Reaction II)

In my above-identified application it is pointed out that the temperature factor is critical in performing the magnesia precipitating reaction, and particularly that the $MgCl_2$ brine should enter the reactor at a temperature not over 65° F., and the temperature rise during the reaction should be limited to from 4° to 6° F. That requires, at least in summer weather, artificial cooling of the regenerated brine. It is pointed out also that the introduction of sulfate into the cycle, e. g., by carbonating with kiln gases where the fuel used in calcining the dolomite carries sulfur, should be avoided because it has an adverse effect upon the settling and filtering properties of the $CaCO_3$. Inasmuch as it is economically desirable to use the kiln gases for carbonation, that restriction makes it necessary either to use sulfur-free fuel or to process the kiln gases to remove sulfur oxides, both of which are objectionable from the standpoint of economy.

It is among the objects of the present invention to provide a process in accordance with that of my aforesaid application Serial No. 402,935 in which mechanical refrigeration of the magnesium chloride brine is unnecessary, and in which the temperature of that brine as supplied for precipitation of magnesia may be as high as 85° F. so that atmospheric cooling of the brine suffices in all seasons.

Another object is to provide a modification of the process of my aforesaid application in which sulfate is deliberately introduced into the cycling brine, suitably as gypsum, to increase the filtering rate of the hydrated magnesia without objectionably affecting the settling and filtering characteristics of the calcium carbonate, and which in a particular embodiment provides for removal of sulfate from the liquors cycled to evaporators, to avoid scaling.

Yet another object is to provide a process of this general type in which the sulfate is introduced into the cycling magnesium chloride brine by using it to scrub the gases from the kiln in which the hydrated magnesia is dead burned, and in a particular embodiment of which a portion of the calcium carbonate produced in the process is cycled to the magnesium chloride brine used for such scrubbing to react with the sulfur dioxide and hydrogen chloride carried by the kiln gases and with atmospheric oxygen to produce calcium sulfate and chloride.

Still another object is to provide a modification of the process of my aforesaid application in which the calcium carbonate is precipitated in an exceptionally finely divided state and is rendered highly filterable without increasing its grain size by heating a thickened slurry of the carbonate in the attendant brine prior to filtration.

Another object is to provide a process of hydrating calcined dolomite which renders the hydrates resistant to dispersion and to formation of colloidal or slow settling and slow filtering hydrated magnesia when the hydrates are mixed with magnesium chloride brine, and which permits the introduction of sulfate into the brine to increase the filtering rate of the hydrated magnesia.

Yet another object is to provide a process of producing hydrated magnesia by reaction of hydrated dolomite calcine and magnesium chloride brine which results in a magnesia that settles and filters at commercially acceptable rates and forms cakes of unusually high solids content.

A further object is to produce, by carbonation of a slurry of hydrated magnesia in a calcium chloride brine, calcium carbonate that is of low magnesia content and is exceedingly finely divided, and which settles and filters quickly and easily.

Another object is to apply sulfate to advantage in producing magnesia by a process of the type described while controlling the $SO_3$ concentration in the cycle so as to maintain filterability of the $CaCO_3$ cake.

Other objects will be recognized from the following description of the invention.

The present invention will be described with reference to the accompanying flow sheet, which represents its application to the process of my above-identified application.

I have discovered, and it is upon this that the invention is predicated in part, that sulfate in solution in the $MgCl_2$ brine is highly advantageous in the production of magnesia by reaction of magnesium chloride brine with hydrated dolomite calcine, in that the sulfate acts to reduce dispersion of the hydrated magnesia and the magnesia produced settles and filters at an acceptable rate. Thus, as apoplied to the magnesia branch of the process of my aforesaid application, to which this invention is particularly applicable, the $Mg(OH)_2$ can be filtered at a commercially economical rate, and though the filtering rate is not so rapid as in the case of the process of my application Serial No. 402,935, the filter cake is much denser, which is desirable and compensates, at least in part, for the slower filtering rate.

The magnesium chloride brine preferably contains the sulfate as calcium sulfate, suitably as gypsum ($CaSO_4$), which is dissolved in the brine. A special feature of the present invention is the provision of an economical mode of adding dissolved sulfate to the circulating magnesium chloride brine. As described in greater detail hereinafter, this is accomplished by using the regenerated $MgCl_2$ brine from the carbonate branch to scrub the gases of combustion from the kiln in which the $Mg(OH)_2$ is dead burned. The $Mg(OH)_2$ cake naturally carries a small amount of sulfate and chloride, chiefly as $CaSO_4$, $MgSO_4$, $MgCl_2$, and $CaCl_2$, and those salts are decomposed in the kiln with production of hydrogen chloride (HCl) and sulfur dioxide ($SO_2$), and when the gases are scrubbed as stated these acid gases react with the brine to form sulfate and chloride. By cycling to this brine a portion of the precipitated calcium carbonate, calcium sulfate and chloride are formed in that way.

I have discovered also, and the invention is further predicated upon this, that dispersion of the $Mg(OH)_2$ is further repressed by dry hydrating the dolomite calcine with a greater amount of $CaCl_2$ brine than is stated in my aforesaid application to be preferable. More particularly, I have found that this result is accomplished by increasing the amount of brine up to the maximum amount that is compatible with production of a dry hydrate, even to the extent that the hydrate when freshly produced is slightly damp. This results in substantial increase in the proportion of grains of hydrated magnesia that are resistant to dispersion.

Some of the sulfate will naturally be carried down by the precipitated magnesia, probably as $MgSO_4$. However, the brine that is formed, usually referred to as magnesia end brine and containing both $MgCl_2$ and $CaCl_2$, carries a substantial amount of calcium sulfate which, as mentioned in my copending application, causes the precipitated $CaCO_3$ to be finer than when sulfate is not present. Normally that is disadvantageous because it reduces the filtering rate. I have discovered, however, that this tendency can be overcome and the calcium carbonate caused to filter at a rapid rate without substantially increasing its particle size by boiling the calcium carbonate slurry prior to filtration. Moreover, and for some reason unknown to me, the small amount of sulfate in the calcium chloride brine results in a calcium carbonate containing less magnesia (MgO) than where sulfate is not present. Additionally, the $CaCO_3$ removes from the regenerated $MgCl_2$ brine all but minute traces of $CaSO_4$. This is obviously of major advantage because otherwise the evaporators which are necessarily used to bring the brine to proper concentration would scale rapidly and seriously.

I have found that it is advantageous for the $MgCl_2$ brine to contain sulfate equivalent to about 0.0015 to 0.0025 gram of $SO_3$ per cc of brine when supplied for reaction with the dolomite. In a typical operation in accordance with the present invention the $CaCl_2$ brine which leaves the thickeners in the magnesia branch will carry $CaSO_4$ equivalent to about 0.0014 to 0.0017 gram of $SO_3$ per cc. By aging this brine, as by storing it for 12 to 18 hours, $CaSO_4$ is spontaneously precipitated and the $SO_3$ content of the brine is reduced to about 0.0006 to 0.0009 gram per cc. This I have found to be advantageous because the results in the carbonate branch are better than where the brine is fed to it direct from the magnesia branch. This spontaneous deposition of calcium sulfate is not understood because presumably the brine is unsaturated with respect to gypsum, but the precipitated form is probably anhydrite.

Typically the $MgCl_2$ brine regenerated in the carbonate branch from $CaCl_2$ brine aged as just described will contain $CaSO_4$ equivalent to about 0.000065 to 0.00014 gram of $SO_3$ per cc, which is so low a concentration that little, if any, scaling due to gypsum will occur in evaporation of this brine.

The invention may be described further with particular reference to its application to the process of my aforesaid application Serial No. 402,935. As described in that application, and having reference to the accompanying flow sheet, the raw dolomite, suitably in the form of lumps about ⅛ inch to 1¾ inches size is calcined in a rotary kiln 1, advantageously at a temperature of about 2450° to 2550° F. After cooling, the calcine is fed to a crusher 2 to prepare it for dry hydrating in a hydrator 3 of conventional type. For this purpose there is preferably used a $CaCl_2$ brine which is substantially free from $MgCl_2$ and is of about 1.05 to 1.08 specific gravity. As little as 0.4 per cent of $MgCl_2$ in this brine suffices to reduce seriously the filtering rate of the $Mg(OH)_2$. As indicated above, the present invention provides an improved mode of hydrating the calcine which will be described in greater detail hereinafter.

The dry hydrated material may be stored for a period of time in a bin, not shown, which is ordinarily desirable because aging for, say 1½ hours appears to permit some cementing action to occur which further increases resistance to dispersion of the precipitated magnesia. Also, it results in the hydrate becoming thoroughly dry, probably by continued hydration of MgO.

The dry hydrated material is then ground and classified to separate it into a granular fraction, i. e., particles not greater than 65 mesh and not smaller than 325 mesh, and most suitably between —65 and +200 mesh, and a fines fraction composed of particles finer than 200 mesh. In the embodiment shown, this is accomplished by passing the dry hydrates to an air separator 4 which removes most of the +65 mesh material and passes it to a ball mill 5, which operates in closed circuit with air separator 4. Separator 4 passes to a second air separator 6 material substantially all of which is —65 mesh. Air separator 6 removes the fines (—200 mesh fraction) for treatment in the carbonate branch. Material coarser than —200 mesh then passes to a third air separator 7 which returns any —200 mesh material to air separator 6 and passes the granular material of —65 +200 mesh size. Although I now prefer to operate in the manner just indicated, with a sharp cut in particle size between the granular and the fines fractions, it will be understood from what has been said earlier in the application that there may be some overlapping of particle sizes of the two fractions; in every case, however, the particles of the fines fraction average finer than those of the granular fraction, and the average will pass a mesh substantially finer than the mesh retaining the average of the granular fraction. Where the expressions "granular" or "coarser" and "non-granular," "finer," or "fines" fraction are used in this specification and claims, the expressions are understood to have the above significance.

Considering first the magnesia branch, the granular fraction from air separator 7 passes to a surge bin 8 and thence to a container 9 provided with means for agitating the contents, where it is mixed with a further amount of the pure $CaCl_2$ brine to convert it into a smooth, lump-free cream, or slurry. The creamed material then passes to a precipitator 10 for reaction with a cycling $MgCl_2$ brine which, as described in my copending application, is regenerated in the carbonate branch and which preferably contains about 11 per cent of $MgCl_2$ and 3 per cent of $CaCl_2$ and has a specific gravity of about 1.12. A critical factor is that this brine must be supplied in an amount to provide at least 105 per cent excess $MgCl_2$ over the requirements of Reaction I.

In accordance with the present invention, and as described in greater detail hereinafter, this $MgCl_2$ brine contains sulfate in solution. The reaction between the brine and the hydrates precipitates $Mg(OH)_2$ and forms $CaCl_2$. The reaction mixture then passes to a multi-stage thickening system, suitably of the three-stage counter-current decantation type, shown schematically at 11. Where the magnesia is to be used for refractory purposes, the thickened slurry may be passed to a correction tank 12 where it is mixed with such materials as mill scale, clay, iron ore and ground dolomitic stone in appropriate amounts to confer desired properties, as known in the art. Whether corrected or not, the slurry then passes to a filter 13, suitably of the drum type. The filtrate is returned, as shown, to the counter current decantation system 11, while the washed cake is preferably formed into shaped particles, such as cylinders about 1 inch in diameter and 1½ inches long, in a pelletizer 14. The shapes are then dried to hard and rock-like pieces in a conventional dryer 15 after which they pass to a rotary kiln 16 which discharges them as dead-burned magnesia (MgO).

Returning to the counter current decantation system 11, wash water is introduced into the last, or third thickener. The combined wash and filtrate passes as overflow into the second thickener, and the overflow from this passes to the first thickener, the overflow from which constitutes the cycling magnesia end brine used in the carbonate branch. The cycling overflow brine from the first thickener of the counter current decantation system 11 is subjected to a treatment described hereinafter, which constitutes a feature of this invention, before it passes to the carbonate branch.

Turning now to the carbonate branch, the —200 mesh hydrates, or fines, are received in a surge bin 17 from which they pass to a container 18 in which they are creamed to a smooth and lump-free slurry with a portion of the cycling magnesia end brine from the first thickener. As disclosed in my copending application it is important to subject this slurry to a pre-carbonating treatment by agitating it, as in a container 19, with the remainder of the magnesia end brine to convert all of the lime of the dolomitic fine hydrates to $CaCl_2$. It is important also that at the end of this step the slurry carries about 5 per cent excess $MgCl_2$ (or about 0.2 per cent of the total cycling brine at this point) and $CaCl_2$ from about 20 to 30 per cent in excess of the requirements of Reaction II. This results in a suspension of $Mg(OH)_2$ in a brine of calcium and magnesium chlorides having a pH of about 9 to 10. The pre-carbonator 10 also receives an amount of thickened slurry from the last thickener of the counter current decantation system 11 and a further amount from a spray tower 20, the functioning of which is described hereinafter. It also receives $Mg(OH)_2$ slurry from another thickener 21, likewise described subsequently.

From the pre-carbonator 19 the mixture passes to a carbonator 22 into which gases from kiln 1 are passed, preferably after being treated in an electrostatic precipitator 23. The reaction produces precipitated $CaCO_3$ and regenerated $MgCl_2$ brine. The slurry from the carbonator, which at the end of the reaction has a pH of about 5 to 6, then passes to a thickener 24 the underflow from which is subjected to treatment in accordance with the present invention, described later.

Considering now in greater detail the improvements provided by the present invention, I have found that dispersion of the $Mg(OH)_2$ can be repressed both by using a larger amount of $CaCl_2$ brine for hydrating the dolomite calcine and also by having sulfate in solution in the $MgCl_2$ brine, and that the maximum repressing effect is obtained by using both factors. Preferably, hydration in hydrator 3 is effected with as much of the brine as can be used while still producing a dry hydrate. Using the pure $CaCl_2$ brine described above I now prefer to use about 50 to 55 per cent based on the weight of the calcine. This produces a hydrate at a temperature of about 100° to 150° F. which is slightly damp but which dries to a granular mass after storage or aging for about 12 to 24 hours.

The $MgCl_2$ brine overflow from thickener 24 of the carbonate branch is passed together with the filtrate from the $CaCO_3$ filter 25 to a clarifying filter 26 for removal of any residual suspended solid matter that may be present. Filtrate from filter 26 which, as mentioned above, is virtually free from sulfate, passes to a multiple effect evaporator 27 in which it is concentrated to prepare it for recycling to precipitator 10. It is important to note that the CaCO₃ carries down with it almost all of the CaSO₄ present in the slurry from the pre-carbonator. This is important because otherwise the evaporators would scale to such an extent as to interfere seriously with the economy of the process.

A portion of the evaporator effluent, say 30 to 40 per cent, is passed to a spray tower 28 for scrubbing the combustion gases from kiln 16. These gases contain SO₂ and HCl derived from the sulfate of the fuel and from sulfate and chlorides carried by the Mg(OH)₂. This scrubbing will form an acid solution. Most suitably, spray tower 28 also receives a thin slurry of CaCO₃ from the underflow of thickener 24, and in this case the SO₂ and HCl carried by the kiln gases react in the scrubber with formation of CaSO₄ and CaCl₂, together with a minor amount of MgCl₂ and MgSO₄ due to the presence of a small amount of Mg(OH)₂ in the carbonate cake. Oxidation of SO₂ to SO₃ is accomplished by atmospheric oxygen.

After leaving spray tower 28 the mixture passes to a thickener 29. The underflow is passed to waste or returned to the spray tower 28, as desired, and the overflow joins the effluent from evaporator 27 on its way to an atmospheric cooler 30. The spray tower also serves the useful purpose of effecting some evaporation of the brine, thus reducing the load on the evaporators.

At this point it may be noted that a major feature of the present invention is that atmospheric cooling of the brine suffices, which is in contrast with the process of my earlier application in which refrigeration of the evaporator effluent was necessary. Thus, in the present invention the brine may be fed to reactor 10 at a temperature as high as 85° F., and normally without control of the temperature in the reactor. Suitably the temperature of the brine is reduced in cooler 30 so that it reaches reactor 10 at about 70 to 85° F. From cooler 30 the brine passes to a tank 31 where a further amount of calcium sulfate, or gypsum, may be dissolved in it. The brine passes thence to a tank 32 where its composition may be controlled, if need be. For most purposes the brine should at this point be of the 11-3 composition described above as best suited for the precipitation reaction, and this relative amount of MgCl₂ and CaCl₂ is best controlled by the amount of Mg(OH)₂ slurry taken from the underflow of the third thickener of the counter current decantation system 11 and delivered to the pre-carbonating mixer 19.

If the preferred 11-3 MgCl₂ brine contains more CaSO₄ than corresponds to about 0.002 gram SO₃ per cc., the excess crystallizes in about 12 to 18 hours, and a filter 32ª is provided to remove the crystallized gypsum. The cake may be pased to the gypsum dissolver 31.

The cycling magnesia end brine from the first stage of the counter current decantation system 11 contains a substantial amount of calcium sulfate. As indicated above, I have discovered that this can be reduced by storage of the brine to an amount which provides satisfactory results in the carbonate branch. To this end the brine passes to an aging, or storing, tank 33 where it is held for a period of time to permit spontaneous deposition of CaSO₄. It then passes to a filter 34 on its way to creamer 18 and pre-carbonator 19. The CaSO₄ cake from filter 34 may be cycled to the gypsum dissolver 31. A portion of this brine may be by-pased to spray tower 20 for collecting the fines which escape from hydrator 3 with the steam evolved during hydration.

The pure CaCl₂ brine necessary for hydrating the calcine is formed conveniently by passing about 40 per cent of the relatively dilute overflow from the second thickener of counter current decantation system 11 to a reaction tank 35 where it meets a portion of the slurry from creamer 18 of the carbonate branch, these two reactants being so proportioned that MgCl₂ present is converted to Mg(OH)₂, thus producing a slurry of Mg(OH)₂ in a CaCl₂ brine substantially free from MgCl₂. This slurry passes to a thickener 21 from which the underflow goes, as described above, to pre-carbonator 19, while the overflow is passed to a tank 36 where the concentration of CaCl₂ can be adjusted, if need be, by addition of the solid salt. From this tank the brine passes to hydrator 3 and creamer 9.

Returning now to the carbonate branch, the use of brine containing sulfate results, to repeat, in a CaCO₃ which is much finer than is produced under identical conditions but without the presence of sulfate. I have discovered, however, that this fine carbonate can be rendered rapidly filterable without substantially increasing its desirably fine particle size by heating the product from the carbonator, and most suitably by heating it to boiling. To this end the underflow from thickener 24 is passed to a heating tank 37 via a heat exchanger 38 which partially heats the slurry on its way to the heater and partially cools it on its return. The slurry then passes to filter 25, the cake from which is repulped in a repulper 39 and again filtered on a filter 40, where the cake is washed, with production of precipitated CaCO₃.

Further information concerning the invention and the results obtained through its practice may be given with relation to the treatment of dolomite from the northwestern Ohio deposits, to which the invention is particularly adapted. A typical analysis of such a dolomite is:

| | Per cent |
|---|---|
| CaO | 30.31 |
| MgO | 21.49 |
| SiO₂ | 0.35 |
| R₂O₃ | 0.36 |
| Ign. loss | 47.40 |

The hydrated magnesia produced as described above carries about 1.5 to 2.0 per cent of magnesium and calcium chlorides together with calcium sulfate equivalent to about 0.3 to 0.5 per cent of SO₃, both on the dry basis. The slurry of this hydrated magnesia which constitutes the underflow from the counter-current decantation thickener, either with or without correction of its composition as described above, filters at a rate of about 4 to 8 pounds of dry product per hour per square foot of gross drum surface. This is a substantially lower rate than is obtained in practicing the process described in my aforesaid application. However, it is a commercially acceptable rate and there is the advantageous fact that the cake characteristically contains not less than 50 per cent of solids, a content not attained hitherto in hydrated magnesia filter cakes so far as I am aware.

I now believe that this unusually high concentration of solids in the magnesia filter cake is due to a combination of granular and colloidal material which results in maximum density when the slurry is filtered, and that the colloidal magnesia which accomplishes this result arises largely or wholly from effecting the magnesia precipitation at a temperature substantially above that of the process of my above-identified application. It might be expected that this content of colloidal material would render the filtering rate so slow as to prevent commercial application but the fact that the magnesia filters at an acceptable rate is, I believe, due to the modified mode of hydration described above and to the use of a cycling brine containing sulfate in solution. Each of those factors contributes, I believe, to rendering resistant to dispersion the magnesia grains which, as described in my copending application, are aggregates of very small crystals.

I have found further that if for any reason the dispersion of the hydrated magnesia becomes too great, as evidenced by a decrease in filtering rate, this can be controlled over a wide range by refrigerating the wash water that is fed to the countercurrent decantation system, say by cooling it to 40° to 50° F. In the production of 100 tons of calcined magnesia per day by the present process that would involve the refrigeration of only 142 gallons per minute of wash water, as compared with the refrigeration of 338 gallons per minute of the MgCl₂ brine which is required for the production of the same amount of MgO in my earlier process. Thus, dispersion of magnesia may be controlled by cooling the wash water without refrigerating the main flow of brine.

A typical analysis of magnesia produced in this manner is as follows:

|  | Per cent |
|---|---|
| $SiO_2$ | 0.66 |
| $R_2O_3$ | 0.66 |
| CaO | 2.34 |
| MgO | 96.34 |

The precipitated $CaCO_3$ made from brine containing calcium sulfate equivalent to about 0.0006 to 0.0009 gram of $SO_3$ per cc. is extremely fine, having about the following range of particle size which is compared with an average product of my earlier application.

[Percent by weight]

|  | Earlier process | Present process |
|---|---|---|
| Less than one micron | 3 | 30 |
| 1-5 microns | 77 | 58 |
| 5-10 microns | 12 | 7 |
| 10-20 microns | ¹1 |  |
| 20-40 microns | ¹2 |  |
| Over 40 microns | ¹5 | ¹5 |

¹ Aggregates consisting of smaller particles, ranging from about 1-10 microns in diameter.

A typical analysis of dried calcium carbonate cake produced by the present process is as follows:

| $CaCO_3$ | 94.30 |
|---|---|
| $MgCO_3Mg(OH)_2 3H_2O$ | 3.55 |
| $SiO_2+R_2O_3$ | .16 |
| $MgCl_2$ | .30 |
| $CaSO_4$ | 1.69 |

The MgO of this carbonate averages about 40 per cent less than is carried by $CaCO_3$ produced by the process of my aforesaid copending application.

Despite the much greater fineness of this carbonate as compared with that of my earlier process, the heating step which constitutes a feature of the invention maintains a high filtering rate without substantial change of the desirably fine particle size. Thus, if the slurry is filtered without heating the filtering rate is only about 10 to 15 pounds per hour per square foot of total drum surface, but after heating to boiling the rate is 40 to 60 pounds per hour. While I do not commit myself to this, I believe that the carbonate is precipitated, at least in large part, as very fine needle-like crystals of aragonite, and that the heating to boiling converts them into cuboidal crystals of calcite which filter more freely. Thus it will be understood that the invention involves both the concept of using $SO_3$ and a controlled $SO_3$ concentration in $MgCl_2$ brine used for making magnesia cyclically while maintaining the filterability of $CaCO_3$ made from the magnesia end brines.

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically described.

I claim:

1. In a cyclic process of producing magnesia and calcium carbonate from calcined dolomite in which the dolomite is dry hydrated with a calcium chloride brine, the hydrated material is divided into a granular and a fines fraction the particles of which average finer than those of the granular fraction, said granular fraction is treated with cycling magnesium chloride brine to precipitate hydrated magnesia and produce a cycling calcium chloride brine, and the magnesium chloride brine is regenerated by treating said fines fraction with said cycling calcium chloride brine and carbon dioxide, the steps comprising dry hydrating the dolomite calcine with said calcium chloride brine substantially free from magnesium chloride, and effecting said precipitation of hydrated magnesia with a magnesium chloride brine containing dissolved sulfate and thereby repressing dispersion of the hydrated magnesia.

2. In a cyclic process of producing magnesia and calcium carbonate from calcined dolomite in which the dolomite is dry hydrated with a calcium chloride brine, the hydrated material is divided into a granular and a fines fraction the particles of which average finer than those of the granular fraction, said granular fraction is treated with cycling magnesium chloride brine to precipitate hydrated magnesia and produce a cycling calcium chloride brine, and the magnesium chloride brine is regenerated by treating said fines fraction with said cycling calcium chloride brine and carbon dioxide, the steps comprising dry hydrating the dolomite calcine with said calcium chloride brine substantially free from magnesium chloride, and said precipitation of hydrated magnesia is effected with a magnesium chloride brine containing dissolved calcium sulfate and at a temperature of about 70° to 85° F.

3. A cyclic process of producing magnesia and calcium carbonate from calcined dolomite comprising dry hydrating the dolomite with about 50 to 55 per cent by weight of calcium chloride brine substantially free from magnesium chloride and of 1.05 to 1.08 specific gravity dividing the hydrates into a granular and a fines fraction the particles of which average finer than those of the granular fraction, reacting said granular fraction with a cycling magnesium chloride brine containing dissolved sulfate to precipitate hydrated magnesia and produce a cycling calcium chloride brine containing sulfate, and treating said fines fraction with said cycling calcium chloride brine and carbon dioxide to precipitate calcium carbonate and regenerate magnesium chloride brine substantially free from sulfate.

4. A process according to claim 3 in which said calcium chloride brine is aged to effect precipitation of a portion of its dissloved sulfate as $CaSO_4$.

5. A cyclic process of producing hydrated magnesia and calcium carbonate from calcined dolomite which comprises dry hydrating the dolomite calcine with about 50 to 55 per cent by weight of a calcium chloride brine substantially free from magnesium chloride and of about 1.05 to 1.08 specific gravity, dividing the hydrates into granular and fines fractions, the particles of said fines fraction averaging finer than those of said granular fraction, treating the granular fraction with magnesium chloride brine containing dissolved sulfate to precipitate hydrated magnesia and form a calcium chloride brine containing sulfate, treating the fines fraction with said calcium chloride brine and carbon dioxide to precipitate calcium carbonate and regenerate magnesium chloride brine substantially free from sulfate, settling the precipitated calcium carbonate to form a thickened slurry, heating said slurry to boiling and thereby increasing the filtering rate of the carbonate, and filtering the slurry.

6. A process according to claim 5 in which said magnesia is dead burned in a kiln, and the gases from said kiln are scrubbed with said regenerated brine and a portion of said carbonate, whereby to add calcium sulfate to the brine and prepare it for recirculation to treat a further amount of the granular hydrates.

7. A process according to claim 5 in which the filtrate from said $CaCO_3$ slurry is evaporated to concentrate it, and sulfate is added to the concentrated brine and to prepare it for recirculation to treat a further amount of the granular hydrates.

8. A process according to claim 5 in which the filtrate from said $CaCO_3$ slurry is evaporated to concentrate it, and gypsum is dissolved in the brine to prepare it to treat a further amount of the granular hydrates.

9. In a cyclic process of making magnesia and calcium carbonate from dolomite in which calcined dolomite is reacted in a magnesia branch of the process with a strong magnesium chloride brine to precipitate hydrated magnesia and produce an end brine containing calcium chloride, and said end brine is reacted in a carbonate branch of the process with another portion of calcined dolomite and carbon dioxide to produce calcium carbonate and regenerate said magnesium chloride brine, the steps of dry hydrating the calcined dolomite, prior to said reactions, with calcium chloride brine substantially free from magnesium chloride, grinding and separating the hydrated material into a granular portion and a fines portion the particles of which average finer than those of said granular portion, passing said granular portion to said magnesia branch of the process and said fines portion to said carbonate branch, and maintaining a concentration of $SO_3$ in said strong magnesium chloride brine used in said magnesia branch of about 0.0015 to 0.0025 gram per cc., whereby the grains of the granular fraction are rendered resistant to dispersion.

10. In a cyclic process of making magnesia and calcium carbonate from dolomite in which calcined dolomite is reacted in a magnesia branch of the process with a strong magnesium chloride brine to precipitate hydrated magnesia and produce an end brine containing calcium chloride, and said end brine is reacted in a carbonate branch of the process with another portion of calcined dolomite and carbon dioxide to produce calcium carbonate and regenerate said magnesium chloride brine, the steps of dry hydrating the calcined dolomite, prior to said reactions, with about 50 to 55 per cent by weight of the calcined dolomite of a calcium chloride brine substantially free from magnesium chloride, whereby the fresh dry hydrate is slightly moist but displays no free moisture, storing the thus hydrated material until it is dry, grinding and separating the hydrated material into a granular portion and a fines portion the particles of which average finer than those of said granular portion, passing said granular portion to said magnesia branch of the process and said fines portion to said carbonate branch, maintaining a concentration of $SO_3$ in said strong magnesium chloride brine used in said magnesia branch of about 0.0015 to 0.0025 gram per cc., whereby the grains of the granular fraction are rendered resistant to dispersion, and carrying in brine of said carbonate branch before carbonation a concentration of $SO_3$ of about 0.0006 to 0.0012 gram per cc.

11. In a cyclic process of making magnesia from dolomite by reacting one portion of calcined dolomite with magnesium chloride brine in a magnesia branch of the process to precipitate hydrated magnesia, and in which process the magnesium chloride brine used in said magnesia branch is regenerated by treating the end brine from the said reaction with a second substantially equal portion of calcined dolomite and carbon dioxide with precipitation of calcium carbonate, that method of producing the calcium carbonate in a rapidly settling and free filtering form which comprises treating said second portion of calcined dolomite with said end brine from the magnesia branch in an amount to react with all of the lime in said second portion of dolomite and provide a slight excess of magnesium chloride, to thereby provide a slurry of hydrated magnesia in a brine containing predominantly calcium chloride, then carbonating the said slurry, and carrying in the calcium chloride brine before carbonation a concentration of $SO_3$ of about 0.0006 to 0.0012 gram per cc.

12. A process according to claim 11 in which the pH of said slurry before carbonation is 9.0 to 9.5.

13. In a cyclic process of making magnesia and calcium carbonate from dolomite in which one portion of calcined dolomite is reacted in a magnesia branch of the process with a magnesium chloride brine to precipitate hydrated magnesia and produce an end brine containing calcium chloride, and said end brine is reacted in a carbonate branch of the process with another substantially equal portion of calcined dolomite and carbon dioxide to produce calcium carbonate and regenerate said magnesium chloride brine, the method of producing a rapidly settling free filtering calcium carbonate in said carbonate branch, and hydrated magnesia in said magnesia branch which is highly resistant to dispersion, which comprises beginning the reaction in said magnesia branch with a concentration of $SO_3$ of about 0.0015 to 0.0025 gram per cc., and beginning carbonation in said carbonation branch with a concentration of $SO_3$ of about 0.0006 to 0.0012 gram per cc.

14. In a process of producing magnesia and calcium carbonate from calcined dolomite in which the dolomite is dry hydrated with a calcium chloride brine so that a product containing granular hydrated material is produced, grinding the granular material to below a predetermined particle size and separating said ground material into a granular portion and a fines portion the particles of which average finer than those of the granular portion, said granular portion is treated with magnesium chloride brine to precipitate magnesium hydrate and produce a calcium chloride brine, and magnesium chloride brine is made by treating said fines portion with calcium chloride brine and carbon dioxide, the step of effecting said precipitation of magnesium hydrate with magnesium chloride brine containing dissolved sulphate and thereby repressing dispersion of the hydrated magnesia.

15. A cyclic process of producing hydrated magnesia and calcium carbonate from calcined dolomite which comprises dry hydrating the dolomite calcine with about 50 to 55 per cent by weight of a calcium chloride brine substantially free from magnesium chloride and about 1.05 to 1.08 specific gravity, dividing the hydrates into granular and fines fractions, the particles of said fines fraction averaging finer than those of said granular fraction, treating the granular fraction with magnesium chloride brine containing dissolved sulfate to precipitate hydrated magnesia and form a calcium chloride brine containing sulfate, treating the fines fraction with said calcium chloride brine and carbon dioxide to precipitate calcium carbonate and regenerate magnesium chloride brine substantially free from sulfate, settling the precipitation calcium carbonate to form a thickened slurry, and filtering the slurry.

ROBERT D. PIKE.